July 7, 1942.  C. LUCKHAUPT  2,288,633

METHOD OF TREATING POROUS MATERIALS

Filed March 28, 1938

INVENTOR.
Christopher Luckhaupt
BY
HIS ATTORNEY.

Patented July 7, 1942

2,288,633

UNITED STATES PATENT OFFICE 2,288,633

METHOD OF TREATING POROUS MATERIALS

Christopher Luckhaupt, Jamaica, N. Y., assignor to L-K-L Processes, Inc., a corporation of New York Application March 28, 1938, Serial No. 198,604

2 Claims. (Cl. 117—123)

This invention relates to a method of treating porous material and products resulting therefrom.

More particularly the invention relates to the treatment of porous material herein defined as non-cellulosic material selected from the group consisting of porous hydro-silicates, asbestos-cement composition, terra cotta, porous tile, gypsum, concrete blocks and bricks. As an example of porous hydro-silicate attention is directed to so-called "Microporite" described and claimed in U. S. patent to Huttemann, No. 2,105,324, dated January 11, 1938. Examples of terra cotta would include clay articles such as flower pots, building brick, and porous tile. Examples of gypsum would include such articles as those made from plaster of Paris.

This application is a continuation in part of a part of my co-pending application, Serial No. 75,929, filed April 23, 1936, entitled "Process of hardening cellulose matter and resulting products," now U. S. Patent No. 2,112,245, granted March 29, 1938.

An object of this invention is the production of products of porous material possessing coefficients of enhanced hardness and enhanced correlated attributes, viz., increased tensile strength, increased flexural strength, increased compressional strength, etc.

An object of the invention is the production of objects of porous material constituency possessing attributes of water-, moisture-, oil-, and/or other proofness, and/or fire-proofness, and/or vermin- and other bacteriological-proofness.

An object of the invention is the production of products of silicon constituency resistant to weather deterioration, including resistance to the effects of the sun, and like exposure.

Another object of the invention is the production of products of constituency embodying one or more of the above stated improved qualities and/or with variant coloring effect.

My invention comprises, in general, the treatment of porous matter which is insoluble in warm terpin hydrate by subjecting the same in suitable relation with terpin hydrate, as by immersion in a suitable bath of the stated treatment material, or by subjecting such matter to a spray of such treatment material, or by subjecting such matter to the vapor arising from the hot treatment material.

Further features and objects of the invention will be more fully understood from the following detail description and the accompanying drawing, in which—

Fig. 2 is a perspective view, in diagrammatic form, illustrating a product formed pursuant to my process, the illustration being typical of molded or other fabricated products of porous material, such as asbestos board and the like.

Figure 1:
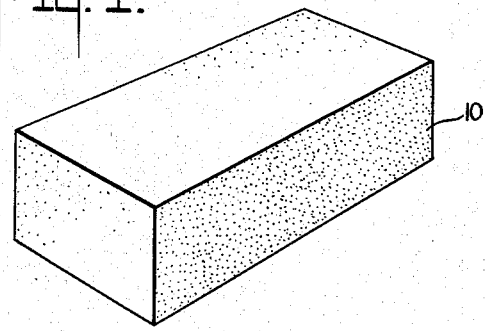
Fig. 1 is a perspective view, in diagrammatic form, illustrating porous matter insoluble in warm terpin hydrate, such for example as porous hydrosilicates, gypsum and the like, treated pursuant to my process, the product represented in this figure being typical of porous material treated pursuant to my process.

Referring to the drawing illustrating typical products attained pursuant to my invention, and indicative of other products suitable to the attainment of the purposes of my invention;

In general, my process consists in treating objects of original natural or artificial porous material, as porous hydrosilicates, gypsum and the like with terpin hydrate or equivalent, as by immersion, spraying or to the action of the vapor arising from warm terpin hydrate or equivalent material, whereby such treatment material penetrates the pores or interstices of such objects. Such penetration may be had to any depth desired and there is imparted to the objects greatly improved physical attributes and immunity to water, moisture, oils and other chemical, and other attributes, as appears more fully hereinafter.

Preferably, pursuant to my immersion procedure, the treatment material is heated to a temperature of from 115° C., and upward, in a suitable tank or other container, the object to be treated being immersed in such bath, and upon withdrawal therefrom, the treated object is passed through an atmosphere of elevated temperature, whereupon the product is substantially complete.

Highly satisfactory results are attained by immersing the object in a bath of terpin hydrate, $C_6H_8(OH)_2(CH_3)(C_3H_7+H_2O)$, formed by heating terpin hydrate crystals or powder in a suitable container until the terpin hydrate melts, i. e., is dissolved in its own water of crystallization, the temperature of the container being maintained at 115° C., or upward. Such container is preferably substantially closed relative to the outer atmosphere, suitable provision being made for the charging of the object into such container for immersion into such bath, the object after immersion being continued in an atmosphere of a temperature of at least 115° C., for a relatively short time period, usually but a few minutes, whereupon the process is substantially complete.

Preferably, pursuant to my spraying procedure, the treatment material is heated to a temperature of 115° C., and upward, in a suitable vessel, and is then forced through an atomizing nozzle under pressure onto the surface of the article being treated. For economical reasons the articles are preferably placed in a heated chamber isolated from the outer atmosphere, to thereby effect recovery of the excess treatment material.

It is advantageous, in employment of my immersion procedure and spraying procedure, to provide that the treatment material in excess of that absorbed by the treated object, is returned, i. e., in fluid or powder at elevated temperature to the bath or other reservoir containing the supply of the treatment material.

By my process, the object treated is enhanced in hardness, that is to say, increased in tensile strength, flexural strength, compression strength, and other physical characteristics imparting strength and rigidity, etc.

Predicated upon products which I have produced pursuant to my process and upon the results of tests thereon, such hardening and other enhanced attributes are effected by the penetration of terpin hydrate into and within the original porous structure of the treated material and impregnation of the treatment material throughout the treated material, dislodgment and expulsion of moisture and other constituents.

Color, as desired, may be imparted to the treated article, by adding suitable color, such as aniline, vegetable, mineral and other dyes, pigments, etc. to the melted terpin hydrate.

Fig. 1 illustrates at 10 a generally solid article such as a brick, concrete block or clay, tile, block or other unit for wall, floor, ceiling, etc., of buildings, treated pursuant to my invention as elsewhere herein more specifically set forth.

Figure 2:

Fig. 2 illustrates at 11 an object, specifically shown as a molded or cast ornamental figure treated pursuant to my invention as elsewhere herein more specifically set forth.

Figure 3:
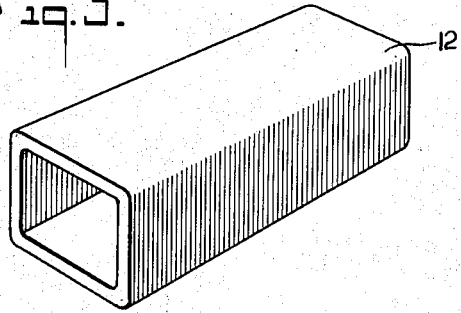
Fig. 3 is an elevational view, in diagrammatic form, illustrating a hollow object of porous material constituency which is insoluble in warm terpin hydrate, the indicated object being treated pursuant to my invention and being typical of various forms of bottomless as well as bottomed objects.

Fig. 3 illustrates at 12 an object specifically of mechanically cellular structure but typical generally of fabricated non-solid constituency, treated pursuant to my invention as elsewhere herein more specifically set forth.

Figure 4:
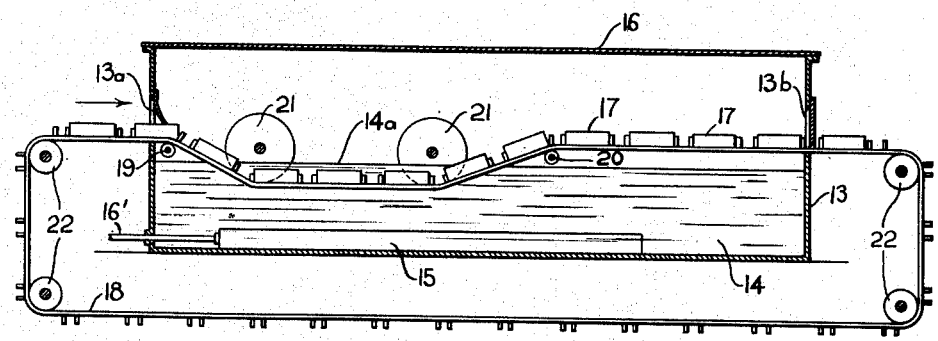
Fig. 4 is a diagrammatic view, in elevation, indicating certain essential steps in carrying out the immersion method of my invention.

Fig. 4 diagrammatically indicates an approved type of tank 13 for containing a bath 14 of the treatment material, constituted as more specifically set forth elsewhere herein, which bath may be maintained at the desired elevated temperature by means of a heating element shown diagrammatically at 15, advantageously of electrical type, the electrical wiring being indicated at 16'. Such tank is substantially wholly closed to the outer atmosphere, as by a cover, canopy or other form of closure indicated at 16; suitable means of entry as at 13a and of exit as at 13b are afforded for the objects, which are insoluble in the treatment material at the treatment temperature, to be treated, as for instance by continuous operation upon a series of objects indicated at 17 to be immersed in and conveyed through such bath 14, as by means of an endless chain conveyor 18 of conventional or other approved type, suitable mutually spaced breaker rolls being indicated at 19, 20, within such tank 13 to effect the lowered travel of such endless chain 18 to fully immerse such objects 17 below the level 14a of such bath 14; such complete immersion may be positively had by the employment of the supplemental rolls indicated at 21, 21. Breaker rolls are indicated at suitable locations 22 exteriorly of the tank 13 for the desired travel of the endless chain conveyor 18 and the propulsion of the same.

Characteristic properties of objects, which are insoluble in the treatment material at the treatment temperature, treated pursuant to my invention reside in the complete closure of the normal interstices of the surfaces of the original material and complete closure of inner cells and/or voids, by the impregnated terpin hydrate; further, by my process the surfaces of the treated product are rendered wholly smooth. If an external finish is desired, the treated product requires but simple finishing operation, such as a simple sanding operation, to fully prepare the object for any surface finish such as by the medium of shellacs, or varnishes, or oil paints of turpentine, linseed oil, benzene, mineral spirits as vehicles, or lacquers such as of nitrocellulose, acetycellulose and the like, or of other soluble "cottons," phenol derivative and other synthetic resins, casein, paints, etc.

My treatment material may be employed as a priming coat for the stated materials, rendering the treated object water-proof, etc., applicable for objects subject to water immersion, steam and other moisture exposure, etc.

A further characteristic resides in the attribute that the treated product preserves permanently the contour inward as well as outward and all dimensions of the original pre-shaped object treated.

Pursuant to my invention, the degree of the respective attributes of hardness and/or water-proofness and/or oil-proofness and/or sound insulation and/or fire-proofness and/or electrical insulation in use as dielectrics is controlled by regulating the temperature of the bath of the treatment material in excess of 115° C., the higher the temperature the greater the degree of imparted stated attributes and vice versa, and/or by regulating the time period of treatment, the longer the period of treatment the greater the degree of imparted stated attributes, and vice versa.

The terpin hydrate may have admixed therewith various substances which, when employed, will impart desirable specific characteristics to the material being treated, such materials to be admixed with oleaginous material of the nature of wax, such as paraffin and glycerin, mineral oils, vegetable oils such as linseed oil, rape oil, perilla oil, Ching-wood oil and soluble "cottons" of the character, for example, as cellulose acetate, ethyl cellulose and nitro cellulose. These various substances may be mixed with the terpin hydrate and melted therewith either singly to impart any particular characteristic to the material being treated or may be combined with each other and with the terpin hydrate. For example, the soluble "cotton" may consist of selected classes and the various classes arranged in groups of not less than two classes. In any event, whether the above specified and like ingredients are used either singly or in combination, the total quantity thereover preferably ranges from 2% to 50% of terpin hydrate. Where wax is employed in connection with vegetable oil or a mineral oil the relative proportions of wax to oil is preferably from 2% to 50% of the quantity of terpin hydrate.

Whereas I have described my invention by reference to specific forms thereof it will be understood that many changes and modifications may be made without departing from the spirit of the invention.

I claim:

1. The method of treating non-cellulosic material selected from the group consisting of porous hydro-silicates, asbestos cement composition, terra cotta, gypsum, concrete blocks and bricks, to impart thereto enhanced tensile, compressional and flexural strengths, which comprises subjecting such material to terpin hydrate at a temperature at or above the melting point of terpin hydrate and thereafter permitting the treated material to cool to atmospheric temperature.

2. The method of treating non-cellulosic material selected from the group consisting of porous hydro-silicates, asbestos cement composition, terra cotta, gypsum, concrete blocks and bricks, to impart thereto attributes of waterproofness and water resistance in addition to enhanced tensile, compressional and flexural strengths, which comprises subjecting such material to terpin hydrate admixed with a fortifier imparting in combination with terpin hydrate water-proofness and water resistance, selected from the group consisting of wax such as paraffin, glycerin, mineral oils, vegetable oils, such as linseed oil, rape oil, perilla oil, Ching-wood oil, and soluble "cottons" such as cellulose acetate, ethyl cellulose and nitrocellulose, the proportion of the fortifier relative to terpin hydrate ranging from 2% to 50%, at a temperature at or above the melting point of terpin hydrate and thereafter permitting the treated material to cool to atmospheric temperature.

CHRISTOPHER LUCKHAUPT.